UNITED STATES PATENT OFFICE.

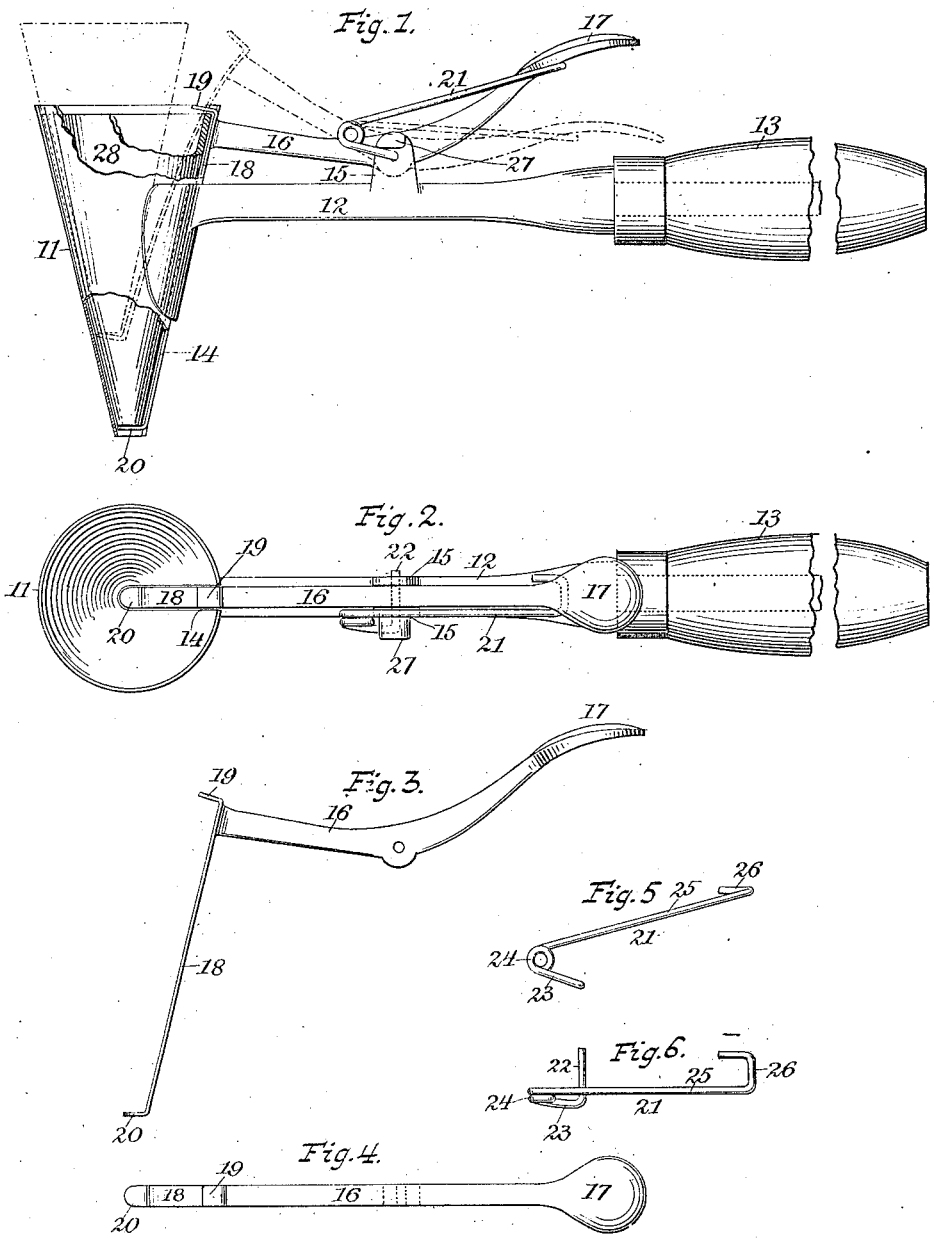

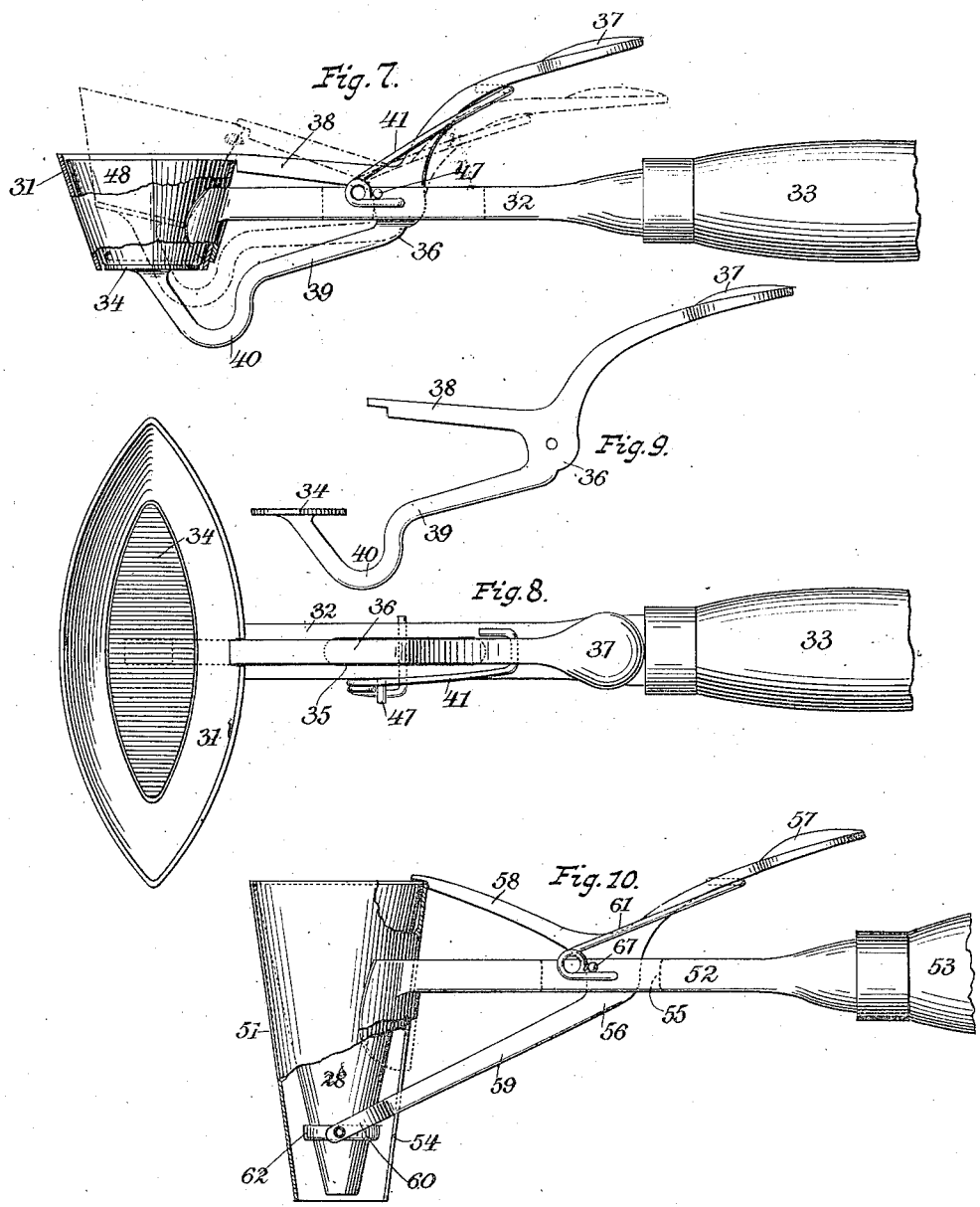

JAMES GEIER, OF TROY, NEW YORK, ASSIGNOR TO CATHERINE NIELSEN AND HENRY S. GILES, BOTH OF TROY, NEW YORK.

ICE-CREAM DIPPER.

1,045,015.        Specification of Letters Patent.      Patented Nov. 19, 1912.

Application filed April 20, 1909. Serial No. 491,187.

*To all whom it may concern:*

Be it known that I, JAMES GEIER, a citizen of the Republic of Switzerland, having made application to become a citizen of the United States, and a resident of Troy, New York, whose post-office address is at 94 Ferry street, in said city of Troy, have invented a new and useful Improvement in Ice-Cream Dippers, of which the following is a specification.

My invention relates to a device for filling and serving ice cream, ices or the like in pastry cones or cups. It provides means for supporting and retaining the pastry receptacle so that it may be dipped directly into the mass of cream, filled and served to the customer without further handling by the operator. Its advantages are; the minimized handling of the edible cup, the rapid and complete filling of the cup without danger of soiling its exterior with the cream, the protection of the cup from breakage and the convenient manner in which the device may be taken apart to be cleaned, whereby it may be kept in sanitary condition.

In the drawings, Figure 1 is an elevation, and Fig. 2, a plan view of one form of my device; Fig. 3 is an elevation, and Fig. 4, a plan of an operating lever; Fig. 5 an elevation, and Fig. 6, a plan of a lever spring; Figs. 7 and 8 are views, like Figs. 1 and 2 respectively, of a modified form of my device; Fig. 9 is an elevation of the lever of Figs. 7 and 8 detached; Fig. 10 is an elevation of still another form of the device.

Referring to the first six figures, 11 designates a dipper body, to which is attached a stem 12 provided with a handle 13. The body or support 11 is shown as of conical shape and formed with a slot 14 in line with the end of the stem 12. As shown, the stem is provided with ears 15, between which is pivoted a lever 16, having at one end a thumb-piece 17 and at its other end a strip 18, which in the normal position of the lever lies within the slot 14 of the body 11, and which is formed at each of its ends with a forwardly extending lug marked 19 and 20 respectively. The curved or bent lever 16 is secured to the stem 12 and held in its normal position by an integral pintle and spring 21, see Figs. 5 and 6, comprising a laterally projecting portion 22, which passes through the ears 15 and lever 16, a forwardly extending portion 23, a bend or coil 24, a rearwardly extending portion 25 and a hook 26, which engages under the lever 16. The spring is held as against rotation on its pintle portion 22 by a lateral lug 27 on one of the ears 15, see Fig. 1. The operation of this form of the device is as follows: A holder, cone or cup, ordinarily of edible material, as pastry, hereafter called a pastry cup, marked 28, is placed in the dipper body 11, first raising the strip 18 by a pressure of the thumb of the operator on the thumb-piece 17. As shown the body 11 closely embraces the entire surface of the cup 28, but it is obvious that it should embrace the cup at its upper edge and otherwise so support it as to prevent breakage. The cup, now held in position by the lug 19 of the strip, is dipped into the mass of cream or the like, filled and lifted out, when a second pressure on the thumb-piece 17 raises the cup by the engagement of the lug 20 with its lower end, see dotted lines, Fig. 1, when the customer may himself lift the cup out of the body 11. When it is desired to clean the dipper, the hook portion 26 of the spring 21 is disengaged from the lever 16, when the pintle portion 22 may be laterally withdrawn and the three parts of the device separated. It will be seen that there are no seams, grooves, overhanging edges or the like to retain the cream and so provide a ptomaine culture medium.

In the form of the device shown in Figs. 7, 8 and 9, the body 31 is shown as "boat-shaped", and is secured as before to a stem 32 having a handle 33. The bottom 34 of the body 31 is detached therefrom and is secured to the end of a bent lever 36, which passes through a slot 35 in the stem 32 and is held in place by an integral spring and pintle 41, similar to that marked 21 in the first device and held from rotation by a pin 47 projecting laterally from the stem 32. The lever 36 is provided as before at its rear end with a thumb-piece 37, and has at its forward end two arms 38 and 39. The tip of the upper arm 38 extends over the adjacent edge of the body 31 and serves as before to engage the pastry cup, here marked 48, and to hold it within the body 31. The lower arm 39 of the lever is, as already stated, secured to the bottom 34 of the body 31 and serves to raise the cup after filling, see dotted lines, Fig. 7, the arm being bent at 40 to permit this movement. The operation of this form of the device is so clearly shown in the drawings and so like that already described, that further description thereof would be superfluous.

The device of Fig. 10 of the drawings shows a dipper body or cup support 51 in the form of a cone frustum attached as before to a stem 52 carrying a handle 53, which stem is slotted for the passage of a lever 56 having a rearwardly extending arm provided with a thumb-piece 57 and two forwardly extending arms 58 and 59. The spring 61 and pin 67 are analogous to the parts 41 and 47 above described. The upper arm 58 of the lever 56 is also like the arm 38 in construction and function. The lower arm 59 of the lever passes through a slot 54 in the cup support 51 and terminates in a fork 60, within which is pivoted a ring 62, which embraces the lower end of the pastry cup 28. The operation of this form of the device requires no additional description. It has been illustrated and described chiefly to show that it is unnecessary that the cup support should correspond in shape or size with the pastry cup so long as it is provided with proper retaining and releasing means for dipping and serving the cup.

As many changes, both in mechanism and design, may be made in my device without departing from my invention, I do not desire to limit the same except as set forth in the claims.

What I claim is:

1. An ice-cream spoon adapted to fill frangible cones, comprising a handle; a bowl on the end of the handle, said bowl having a slot at or near its upper edge; a pivoted trigger on the handle, the free end of said trigger fitting in the slot in the bowl and adapted to engage the upper edge of the frangible cone in the bowl during the dipping operation; means for ejecting the cone from the bowl; and a connection between the latter means and the trigger whereby the latter and the ejecting means will be simultaneously operated.

2. An ice-cream spoon adapted to fill frangible cones, comprising a bowl formed at its upper end with a slot; a handle extending from the bowl; a pivotally mounted trigger extending in the slot at the upper portion of the bowl to engage and hold the upper edge of a frangible cone during the dipping operation; and a spring for holding the trigger in operative position.

3. An ice-cream spoon adapted to fill frangible cones, comprising a bowl formed at its upper edge with a slot; a pivotally mounted trigger having its end extending through the slot at the upper portion of the bowl and adapted to engage and hold the upper edge of a frangible cone during the dipping operation.

4. An ice-cream spoon adapted to fill frangible cones, comprising a bowl and a handle; a trigger pivotally mounted on the handle and having its free outer end extending beyond the plane of the inner upper edge of the bowl to engage the upper edge and hold a frangible cone during the dipping operation; and a spring for operating the trigger.

5. An ice-cream spoon adapted to fill frangible cones, comprising a bowl and a handle; a pivotally mounted trigger having its free outer end extending beyond the plane of the upper inner edge of the bowl; means for ejecting the frangible cone; and a connection between the trigger and the ejecting means for simultaneously operating the trigger, to remove it from operative position, and operating the ejecting means.

6. A dipping device comprising a dipper body; a stem secured to said body; and a lever pivotally mounted on said stem and formed with two projecting portions, one of which is constructed to extend over the upper edge of said body and to retain a pastry cup placed therein, and the other of which is constructed to move upwardly within the lower part of said body so as to raise the cup from its dipping position therein.

7. A dipping device comprising a pastry cup support; a stem secured to said support; a cup retaining and releasing lever; and an integral pintle and spring for detachably securing said lever on said stem.

8. An ice-cream spoon comprising a handle and a bowl, formed with a slot, and a pivoted lever having a trigger which fits in the slot and an arm which forms the bottom of the bowl, the trigger holding a cone in position during the dipping operation and the arm ejecting the cone while the trigger is being removed.

9. An ice-cream spoon, comprising a bowl formed with a slot and an operating lever pivoted to the handle and provided with an end which fits in the slot, and an arm, the end of which is bent to fit in the lower portion of the bowl to form the bottom thereof.

JAMES GEIER.

Witnesses:
GEO. L. COOPER,
BESSIE M. TOLHURST.